United States Patent [19]
Yamamoto et al.

[11] Patent Number: 5,170,270
[45] Date of Patent: Dec. 8, 1992

[54] IMAGE WRITING DEVICE

[75] Inventors: Yoichi Yamamoto, Nara; Masao Narumiya, Shiki, both of Japan

[73] Assignee: Sharp Corporation, Osaka, Japan

[21] Appl. No.: 574,485

[22] Filed: Aug. 28, 1990

[30] Foreign Application Priority Data

Sep. 7, 1989 [JP] Japan .................. 1-232639
Sep. 7, 1989 [JP] Japan .................. 1-232640

[51] Int. Cl.$^5$ .................. G02F 1/13; G02B 26/08
[52] U.S. Cl. .................. 359/45; 359/201; 340/713
[58] Field of Search .................. 359/43, 45, 201, 202; 340/713, 784; 365/108

[56] References Cited

U.S. PATENT DOCUMENTS

| | | | |
|---|---|---|---|
| 3,796,999 | 3/1974 | Kahn | 340/173 R |
| 4,109,316 | 8/1978 | Snyder | 365/112 |
| 4,548,474 | 10/1985 | Nagae et al. | 359/43 |
| 4,696,550 | 9/1987 | Shinoya | 359/45 |
| 4,810,064 | 3/1989 | Azusawa et al. | 340/173 |
| 4,952,034 | 8/1990 | Azusawa et al. | 340/713 |
| 5,026,145 | 6/1991 | Marui et al. | 359/45 |
| 5,103,332 | 4/1992 | Kaneko et al. | 359/45 |

FOREIGN PATENT DOCUMENTS 291300 5/1988 European Pat. Off. .
2581780 11/1986 France .
64-20773 1/1989 Japan .

OTHER PUBLICATIONS

Lu et al, "Laser-Addressed Liquid Crystal Light Modulators for Color Electronic Imaging with Mead Microencapsulated Paper", Society for Information Display International Symposium Digest of Technical Papers, vol. XVIII, New Orleans, La., May 12-14, 1987, pp. 367-370.

Primary Examiner—Bruce Y. Arnold
Assistant Examiner—James Phan
Attorney, Agent, or Firm—David G. Conlin

[57] ABSTRACT

An image writing device including a beam source emitting laser beam, a memory for storing a plurality of frames of image data, a modulator for modulating the laser beam with the image data, at least one liquid crystal cell, a scanner for scanning the liquid crystal cell with the laser beam sweeping the same, a shift device for shifting the liquid crystal cell in the direction orthogonal to the scanning direction, and controller for reading the image data from the memory and actuating the laser beam to write the plurality of frames of images in different areas on the liquid crystal cell.

6 Claims, 8 Drawing Sheets

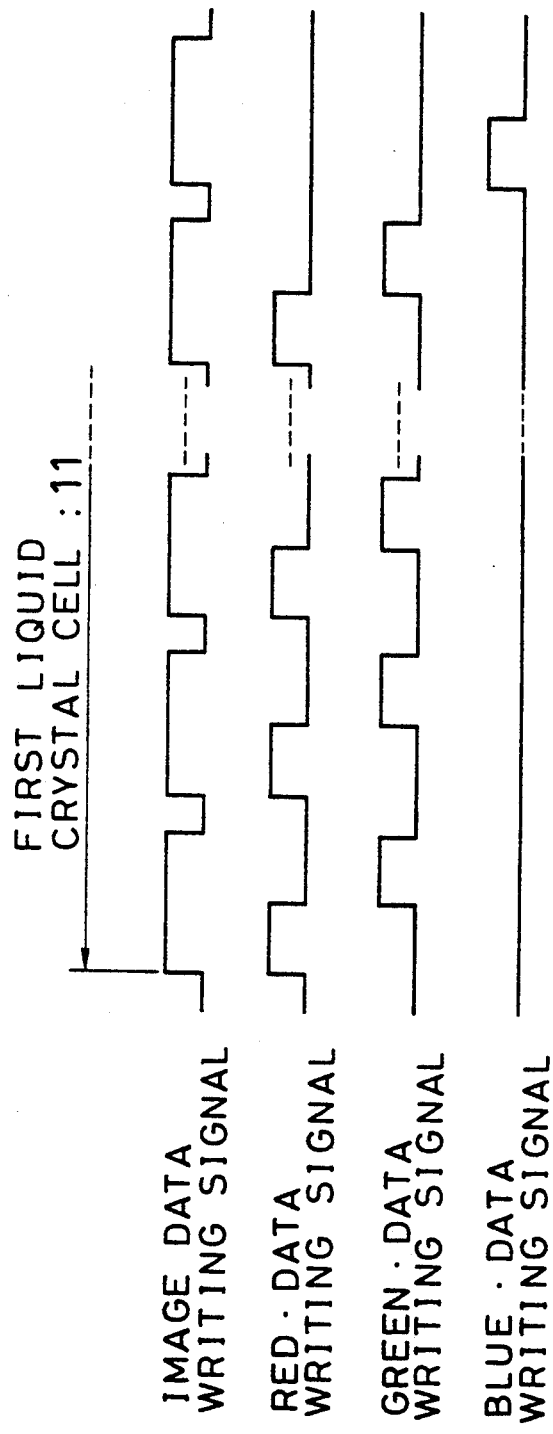

READING SIDE

WRITING SIDE

IMAGE WRITING DEVICE

BACKGROUND OF THE INVENTION

1. Field of the Invention

The present invention relates to an image writing device, employed in an image formation device which prints the image written in a liquid crystal cell, for writing an image in the liquid crystal cell.

2. Description of the Prior Art

The U.S. Pat. No. 3,796,999 discloses a display in which laser beam is selectively directed to a liquid crystal cell to display an image on the liquid crystal. The theory of the display is that the heat of the laser beam is utilized to partially change the liquid crystal in phase and an image is formed corresponding to a pattern with which the laser beam is directed. The liquid crystal employed herein is, for example, a smectic liquid crystal.

Japanese Unexamined Patent Publication No. 20773/1989 discloses a device forming an image with the above-mentioned thermal writing type liquid crystal cell. Transmitted or reflected light of the liquid crystal cell is directed to photosensitive material to form a latent image on the photosensitive material, and an image is formed based upon the latent image. Further, a full color image can be also formed by using three liquid crystal cells having primary color R(red), G(green) and B(blue) images written to compose the three images.

With a prior art image formation device, when an image is written in a liquid crystal cell, an image of a single color is written in a single liquid crystal cell indifferent of the image density. As a result, when an image is of high density, the image is formed throughout the liquid crystal cell, but when the image is of low density, the image can be formed in only a part of the liquid crystal cell if it is desired that the image is written with the same density as a high density image. With a conventional method of writing an image, in order to form a composite image, image data of different colors must be written in different liquid crystal cells although the image itself is small. This is time-consuming labor, and there arises the problem that excessively long writing time is required.

SUMMARY OF THE INVENTION

The present invention provides an image writing device comprising a beam source emitting laser beam, storing means for storing a plurality of frames of image data, modulating means for modulating the laser beam with the image data, at least one liquid crystal cell, scanning means for scanning the liquid crystal cell with the laser beam sweeping the same, shift means for shifting the liquid crystal cell in the direction orthogonal to the scanning direction, and control means for reading the image data from the storing means and actuating the laser beam to write the plurality of frames of images in different areas on the liquid crystal cell.

The writing control means may set a plurality of areas on the liquid crystal cell in the direction corresponding to a scanning line of the laser beam so as to write an image successively in the areas, whereby an efficiency in writing is considerably enhanced.

The writing control means may set a plurality of areas on the liquid crystal cell in the direction orthogonal to the scanning line of the laser beam so as to write an image in the areas.

The plurality of frames of image data may be, for example, three-primary-color image data for composing a single frame of full color image.

Further, according to the present invention, an image writing device comprises a beam source emitting laser beam, modulating means for modulating the laser beam with image data, a plurality of liquid crystal cells, scanning means for scanning the liquid crystal cells with the laser beam sweeping the same, shift means for shifting the liquid crystal cells in the direction orthogonal to the scanning direction, storing means for storing a plurality of frames of image data, writing control means actuating all the above means to selectively perform a first writing operation in which a plurality of frames of images are written in the plurality of liquid crystal cells and a second writing operation in which the plurality of frames of images are written in one of the liquid crystal cells, and instruction means for instructing the writing control means to choose one of the first and second writing operations.

The instruction means preferably decides which should be chosen, the first or second writing operation, in accordance with an image density of the image data.

DESCRIPTION OF THE PREFERRED EMBODIMENTS

Figure 5:
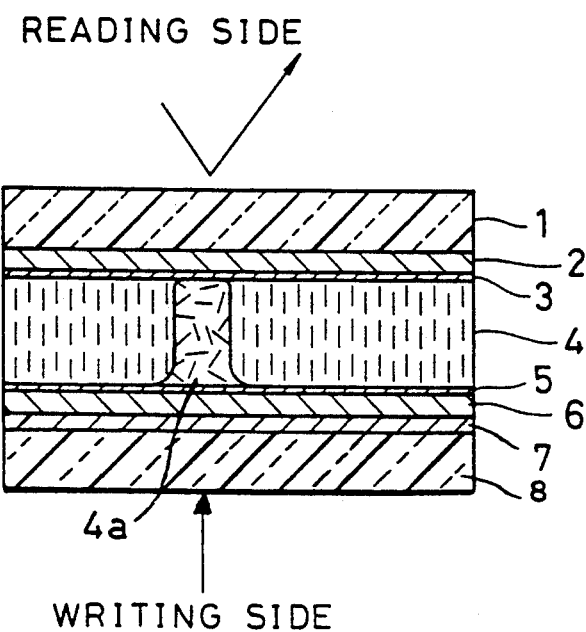
FIG. 5 is a sectional view showing the liquid crystal cell.

FIG. 5 shows a sectional structure of a liquid crystal cell to which an image is written by a laser.

The image is written on the lower side of the crystal cell and read on the upper side of the same. The liquid cell is composed of a glass 1, a transparent electrode 2, a matching layer 5, a reflection layer 6 serving also as an electrode, a heat absorbing layer 7 and a glass 8 in order from top to bottom. With liquid crystal, a smectic liquid crystal is used, which is transparent in the ordinary state. When red light is directed to the liquid crystal cell from the lower side, the heat absorbing layer 7 absorbs it and heats up. This causes the liquid crystal layer 4 to partly change its phase (4a). The phase change results in opaqueness in the part, and consequently, when light is directed thereto from the upper side, the light is absorbed and irregularly reflected. On the other hand, the remaining part of the liquid crystal layer 4 transmits the light, and the reflection layer 6 serving as an electrode reflects it. As a result, a contrast of light arises between the opaque part and the remaining part, and it is read as an image. To erase the image, voltage is applied between the transparent electrode 2 and the reflection layer 6.

Figure 6:
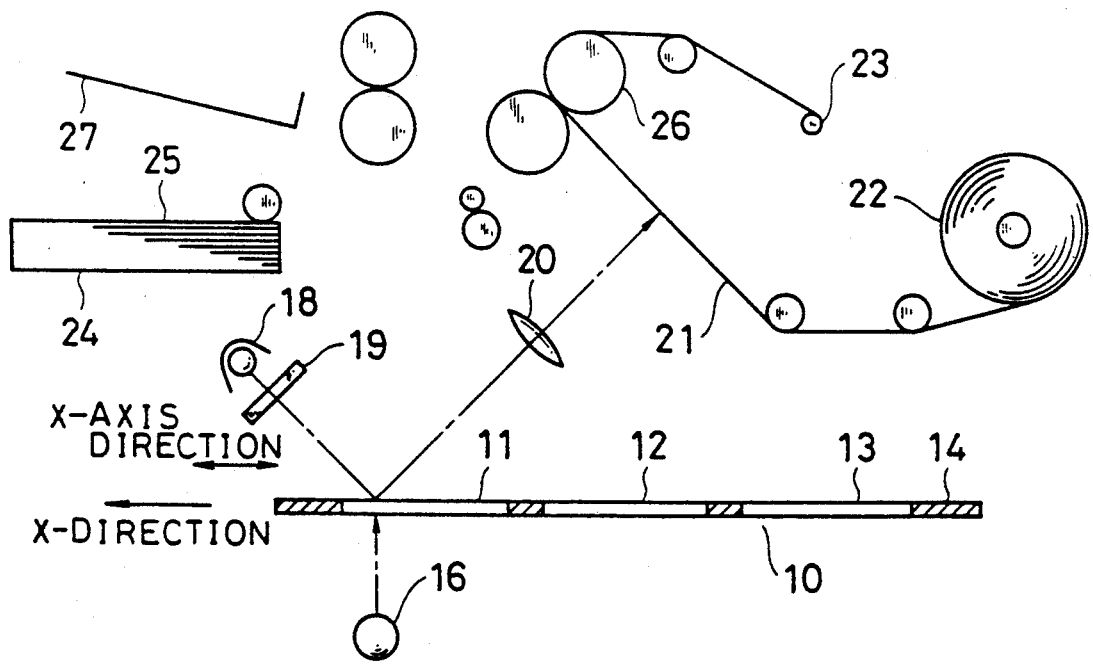
FIG. 6 is a diagram showing a structure of a main part of the printer.

FIG. 6 shows a structure of a main part of a full color printer employing the above-mentioned liquid crystal cell.

Figure 7:
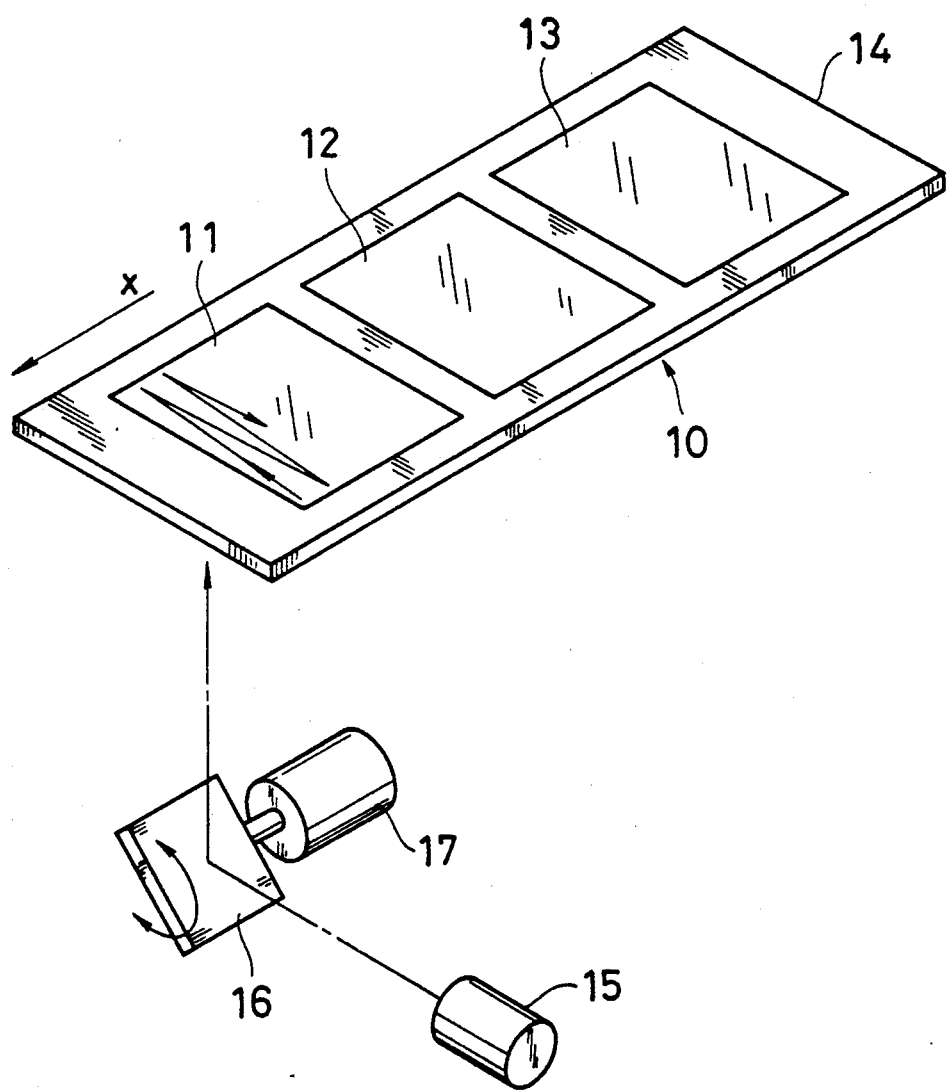
FIG. 7 is a perspective view of a main part of the writing unit.
Figure 8:
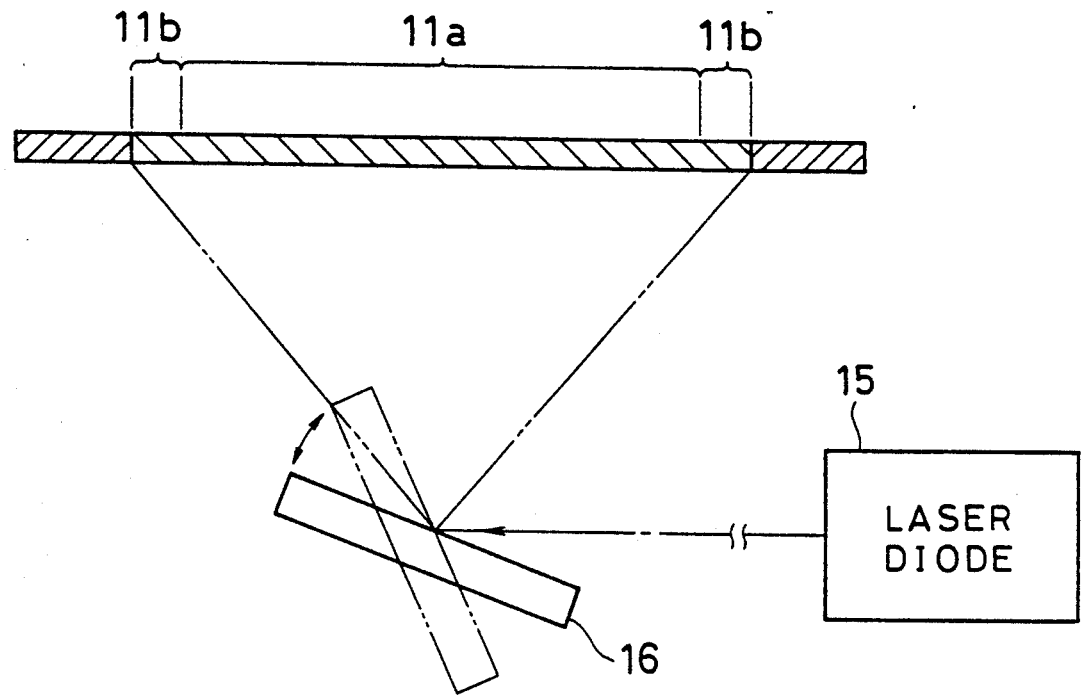
FIG. 8 is a sectional side view showing the writing unit.
Figure 9:
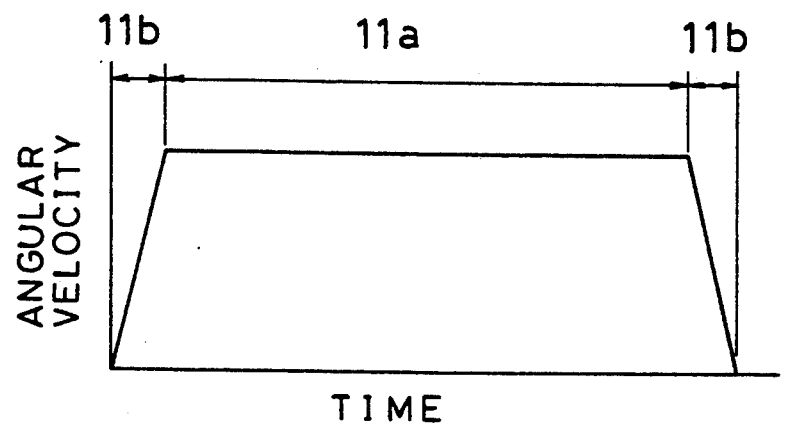
FIG. 9 is a diagram showing a pivoting speed of a mirror when the image is written.

A liquid crystal holder 10 includes three liquid crystal cells 11, 12 and 13 held by a frame 14. The liquid crystal holder 10 is movable in X-axis and Y-axis directions accurately by a linear motor. The Y-axis direction is in agreement with the direction of a laser scanning line. FIG. 7 shows an appearance of the liquid crystal holder 10. Below the liquid crystal holder 10 a writing device including a laser diode 15, a mirror 16 and a rotary encoder motor (referred to simply as "motor" hereinafter) 17 is placed. FIG. 8 shows a cross section of the liquid crystal cell in FIG. 6 seen from the left side. The mirror 16 is reciprocally pivoted between a solid line and a dash-two-dot line by the motor 17 (not shown). By the pivotal movement, laser beam emitted by the laser diode 15 sweeps the scanning spot of the liquid crystal cell 11, and an image is formed in the center portion of an image formation area 11a. The opposite edge portions of the image formation area 11a are areas for approach and overrun. This means that, as shown in FIG. 9, with the reciprocal pivotal movement of the mirror 16, its speed is lowered at the beginning and the turning point of the pivotal movement. This is because the approach and overrun areas are provided on the opposite edge portions in the image formation area 11a. In writing an image, the mirror 16 is reciprocally pivoted shifting the liquid crystal holder 10 in the direction corresponding to an arrow x along the X-axis direction, so that the laser beam sweeps the liquid crystal cell 11 in the Y-axis direction as shown in FIG. 7 so as to scan the image.

Above the liquid crystal holder 10, a reading device including a light source 18, a color separation filter 19 and a zoom lens 20 is placed. The light source 18 may be, for example, a halogen lamp, and the light emitted by the light source 18 sweeps the face of each of the liquid crystal cells 11 to 13 with the shift of the liquid crystal holder 10 in the direction corresponding to the arrow x, the light reflected from the scanned liquid crystal cells 11 to 13 is directed to photosensitive material 21. Images of data R, G and B are written in the liquid crystal cells 11 to 13 in advance. The color separation filter 19 selectively transmits a light of a predetermined color; specifically, it is composed of a filter transmitting a wavelength of red, a filter transmitting a wavelength of green and a filter transmitting a wavelength of blue. With the filter 19, the filter transmitting the wavelength of red is used for reading the liquid crystal cell having the R image written, the filter transmitting the wavelength of green is used for reading the liquid crystal cell having the G image written, and the filter transmitting the wavelength of blue is used for reading the liquid crystal cell having the B image written.

The photosensitive material 21 may be, for example, a photosensitive and pressure-sensitive sheet accommodating full colors, uniformly and dispersively coated with micro capsules 1 containing photo-curing material sensitive to red light and dye developing cyanogen, micro capsules 2 containing photo-curing material sensitive to green light and dye developing Magenta, and micro capsules 3 containing photo-curing material sensitive to blue light and dye developing yellow, as proposed in Japanese Unexamined Patent Publication No. 30537/1984. The photosensitive and pressure-sensitive sheet is wound up on a shaft 22 into a roll and supplied from the shaft 22 to a take-up shaft 23 when an image is formed. In the course of the sheet supply, the photosensitive and pressure-sensitive sheet is exposed to a predetermined color light led through the liquid crystal cells 11 to 13. The reflected light of the R, G and B images on the liquid crystal cells is projected overlapping each other on the same part of the photosensitive material 21. As a result, the above-mentioned capsules 1 to 3 are cured on the same face of the photosensitive material 21, and thus a full color latent image is formed. An imaging sheet 25 put in a paper cassette 24 is supplied to a position against the latent image, and both the sheets are pressed overlapping each other. The micro capsules which did not receive light (corresponding to an opaque area of liquid crystal) are broken, the dye flows out, and thus the image is formed on the imaging sheet. Printing is performed in this way. The imaging sheet having the image formed is subjected to heat treatment and discharged to a paper tray 27.

Figure 1:
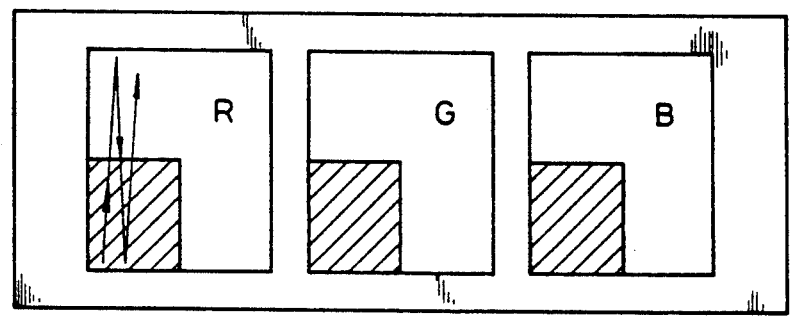
FIGS. 1(A) to 1(C) are diagrams showing exemplary patterns of an image written in a liquid crystal cell.
Figure 1:
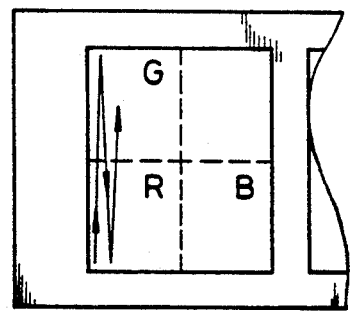
Figure 1:
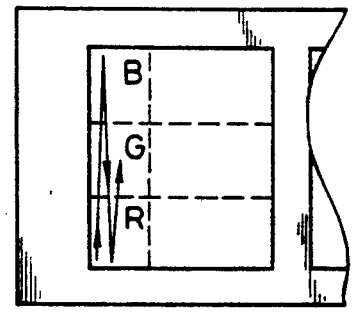

Now, a pattern through which an image is written in the liquid crystal cells according to the present invention will be described. FIG. 1 is a diagram showing an exemplary writing pattern; and FIG. 1(A) shows the three liquid crystal cells 11 to 13 having the R, G and B images written, respectively. Herein, a conventional method is employed, and especially, a state in which a high density image is written in the device of this embodiment is shown. Conventionally, an image to be written is of low density, an image is written in only a part of the liquid crystal cells as shown with an area defined by oblique lines. On the other hand, FIGS. 1(B) and 1(C) show examples of states in which low density images are written, respectively: herein, one of the liquid crystal cells, for example, the liquid crystal cell 11, has the same kinds of images R, G and B written. In the example in FIG. 1(B), the liquid crystal cell 11 is divided into two areas in both the X-axis and Y-axis directions, and consequently each of the areas is ¼ of the original area. In the example in FIG. 1(C), the liquid crystal cell 11 is divided into three areas in the Y-axis direction, and consequently each of the areas is 1/9 of the original area. Such states of division may be obtained by setting several dividing patterns and selecting an appropriate state of division in accordance with an image density. With the device of this embodiment, patterns shown in FIGS. 1(A) and 1(B) can be selected.

Figure 2:
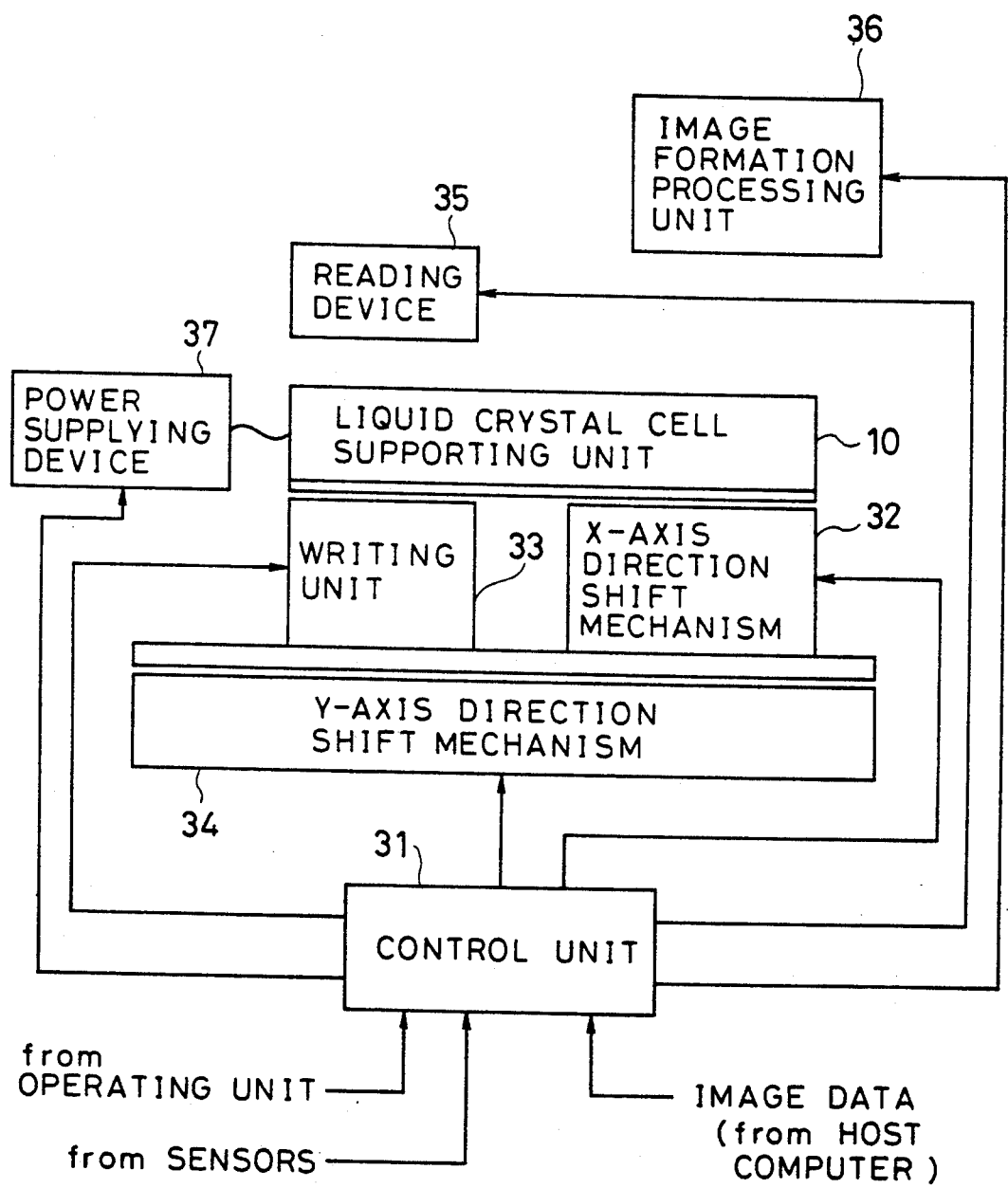
FIG. 2 is a block diagram showing a printer provided with an image writing device.

FIG. 2 is a block diagram showing an image formation device equipped with the above-mentioned liquid crystal cells.

Mechanisms systemized in the image formation device are controlled by a control unit 31. The control unit 31 receives data and sensing results from an operating unit on the image formation device body and various sensors in this device and actuates mechanisms 32 to 37 in accordance with such input data. Also, the control unit 31 receives image data to be written in the liquid crystal cells from a host computer or the like. The control unit 31 transfers the data to a writing unit 33 to actuate the laser diode 15, so that the image is written in the liquid crystal cells.

The liquid crystal cell holder 10 having the liquid crystal cells 11 to 13 is held on an X-axis direction shift mechanism 32, while the X-axis direction shift mechanism 32 and the writing unit 33 are held on the Y-axis direction shift mechanism 34. The X-axis direction shift mechanism 32 and Y-axis direction shift mechanism 34 are shift mechanisms having respective linear motors. The X-axis direction shift mechanism 32 is controlled by the control unit 31 to shift the liquid crystal cells in the X-axis direction when an image is written in the liquid crystal cells, while the Y-axis direction shift mechanism 34 shifts the liquid crystal cells, the X-axis direction shift mechanism 32 and the writing unit 33 in the Y-axis direction when the image written in the liquid crystal cells is read. The shift in the Y-axis direction is for arraingning the center shaft of the image on the liquid crystal cell with the center shaft of the photosensitive material 21 when the image is printed on the photosensitive material. The reading device 35 includes the light source 18, the filter 19 and the zoom lens 20, while an image formation processing unit includes the photosensitive material 21, the imaging sheet 25 and the like (see FIG. 6). These components are actuated in accordance with commands from the control unit 31 to make an image on the imaging sheet 25. A power supplying device 37 applies voltage to the liquid crystal cells to erase the image written therein.

Figure 3:
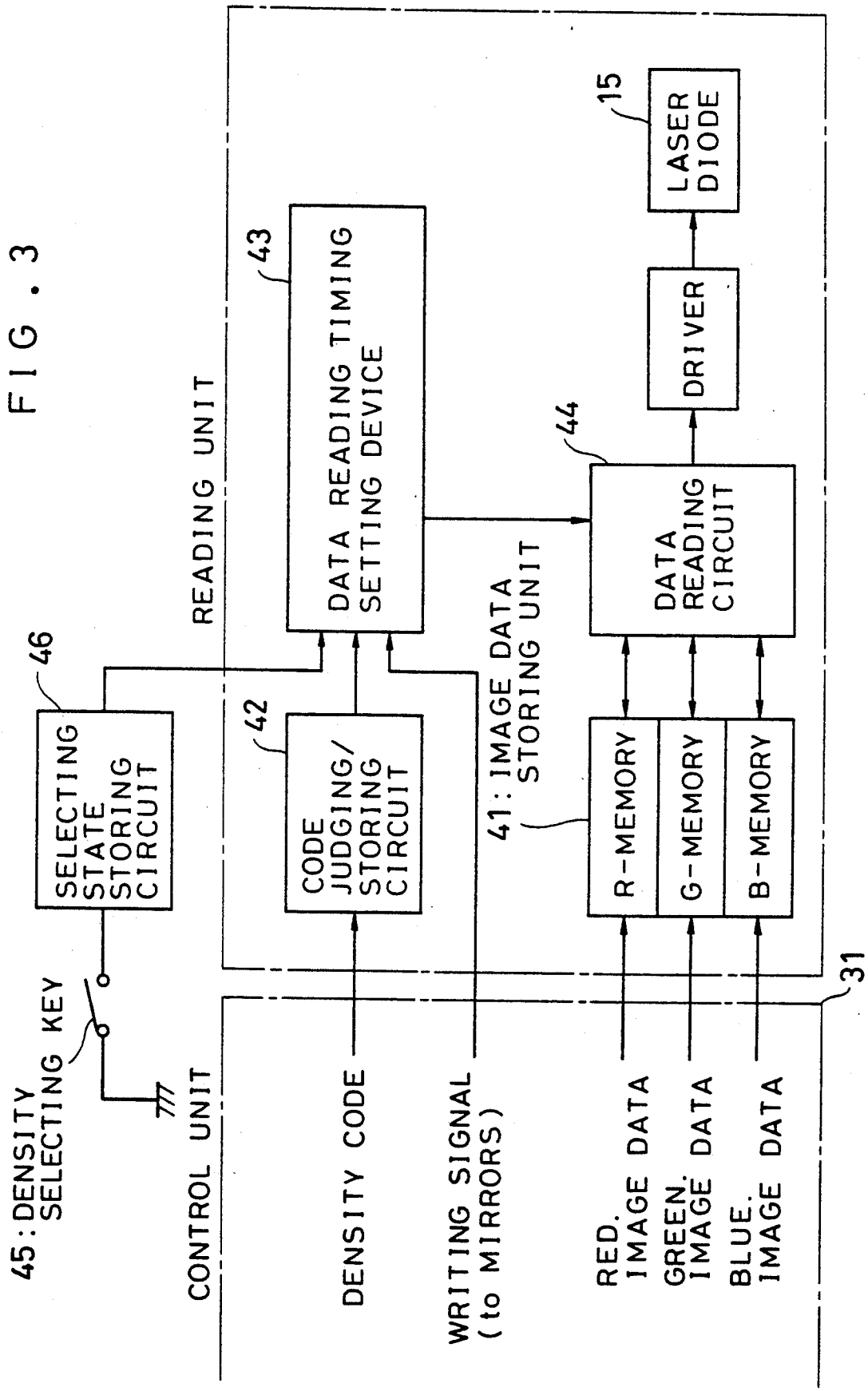
FIG. 3 is a partial block view showing a writing unit of the image writing device.

FIG. 3 is a partial block view showing the image writing unit.

The control unit 31 transmits image data inputted from the host computer or the like to the writing unit 33. The writing unit 33 has an image data storing unit 41 including an R memory storing red image data, a G memory storing green image data and a B memory storing blue image data, for storing image data transferred from the control unit 31. The control unit 31 transmits a density code to a code judging/storing circuit (resolution determining means) 42 simultaneously with the transmission of the data R, G and B. The density code represents a density of the image data to be transmitted, and in this embodiment, there are two levels of density, high density and low density. An image is written as shown in FIG. 1(A) when the image is of high density; while the image is written as shown in FIG. 1(B) when it is of low density. "Low density" means, for example, 150 Dpi or below, while "high density" means, for example, 300 Dpi. A data reading timing setting device 43 sets a timing of reading an image from the image data storing unit in accordance with the density and a data reading circuit 44 reads the image data and actuates the laser diode 15 based upon the timing so as to write an image to the liquid crystal cells. The timing of reading the image data is shown in FIG. 4.

Figure 4:
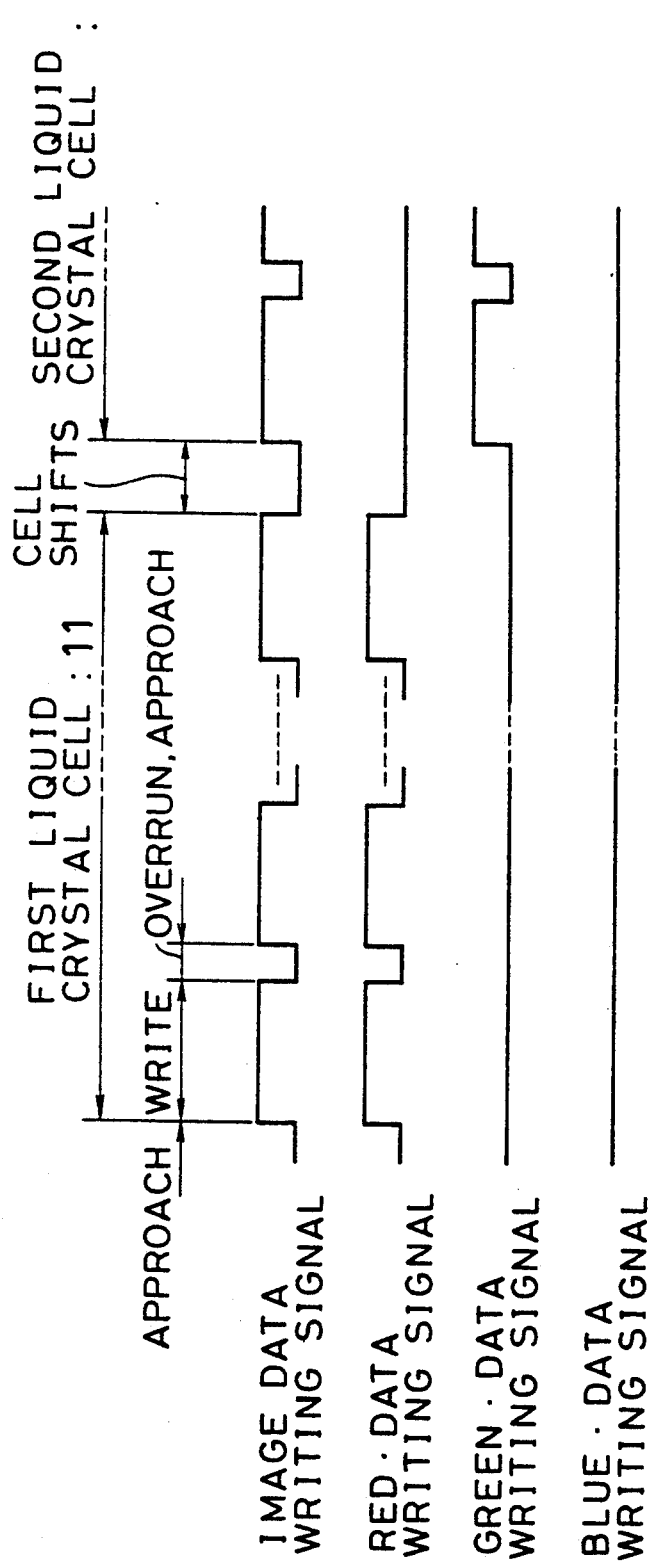
FIGS. 4(A) and 4(B) are diagrams showing timings of an image data writing signal when an image is written in the liquid crystal cell.

An image data writing signal in FIG. 4 is a signal inputted from the control unit 31. The control unit 31 outputs the image data writing signal to the writing unit 33 and the X-axis direction shift mechanism 42 in a timing of writing an image with laser. In response to the signal, the writing unit 33 reads image data from the image data storing unit 41 modulates it for the laser to direct laser beam to the liquid crystal cells, and the laser beam sweeps the liquid crystal cells through the pivotal movement of the mirror 16 to scan the image thereon. The X-axis direction shift mechanism 32 shifts the liquid crystal holder 10. The image data writing signal keeps ON for a period of time corresponding to a section of the writing area 11a (see FIG. 8), but comes OFF for a period of time corresponding to the approach, overrun and the shift of the writing unit 33 from the previous liquid crystal cell 11 to the next liquid crystal cell 12.

The data reading timing setting circuit 43 sets a timing of reading image data based upon the image data writing signal. When the image is of high density (see FIG. 4(A)), a read data writing signal is produced to write red image data in the first liquid crystal cell 11. After the red data is written, a green data writing signal and then a blue data writing signal are produced. On the other hand, when the image is of low density (FIG. 4(B)), both the red and green data writing signals are produced for a single pulse of the image data writing signal. In other words, as shown in FIG. 1(B), both the red and green images are written in a single scanning line of laser beam. After the red and green images are written, the blue data writing signal is produced to write a blue image in a half of a scanning line.

The image writing in the liquid crystal cells is performed in accordance with the data writing signal thus produced. In this embodiment, the timing of reading data is set in accordance with a density code inputted from the control unit 31, but it is also possible that a density selection key 45 is provided on the image formation device body to select a density and a selection sate storing circuit 46 checks the selection state to set the timing in accordance with the state. In this case, when "low density" is chosen through the density selection key 45, the image data stored in the image data storing unit, even if it is of high density, is thinned out to be of low density, and thus the image is written. This allows the user to shorten a time required for printing on his own judgment by performing the image printing with low density if high density printing is not necessary.

With this device, not only a full color image which is a composite image of red, green and blue images but also a composite image which is a combination of different kinds of images can be made. Similarly in this case, the user can choose a liquid crystal cell to be written with an image between large one and small one in accordance with the density of the image.

As has been described, according to the present invention, using writing selection means such as resolution determining means and selection switch, an image can be written in a liquid crystal cell with high accuracy (the image is written each of several liquid crystal cells), or with somewhat lower accuracy (the image is collectively written in a single liquid crystal cell), whereby writing an image with excessively high density would not require an excessively long writing time.

What is claimed is:

1. An image writing device comprising:
a beam source emitting laser beam;
storing means for storing a plurality of frames of image data;
modulating means for modulating the laser beam with the image data;
at least one liquid crystal cell;
scanning means for scanning said liquid crystal cell with the laser beam sweeping the same;
shift means for shifting said liquid crystal cell in a direction orthogonal to the scanning direction; and
control means for reading the image data from said storing means and actuating the laser beam to write said plurality of frames of images in different areas on said liquid crystal cell.

2. A device according to claim 1, wherein said control means sets a plurality of areas on said liquid crystal cell in a direction corresponding to a scanning line of the laser beam so as to write an image successively in the areas.

3. A device according to claim 1, wherein said control means sets a plurality of areas on said liquid crystal cell in a direction orthogonal to a scanning line of the laser beam so as to write an image in the areas.

4. A device according to claim 1, wherein the plurality of frames of image data are three-primary-color image data for composing a single frame of full color image.

5. An image writing device comprising:
a beam source emitting laser beam;
storing means for storing a plurality of frames of image data;
modulating means for modulating the laser beam with the image data;
a plurality of liquid crystal cells;
scanning means for scanning said liquid crystal cells with the laser beam sweeping the same;
shift means for shifting said liquid crystal cells in a direction orthogonal to the scanning direction;
control means for actuating the laser beam to selectively perform a first writing operation in which a plurality of frames of images are written in said plurality of liquid crystal cells and a second writing operation in which the plurality of frames of images are written in one of said liquid crystal cells; and
instruction means for instructing said control means to choose one of said first and second writing operations.

6. A device according to claim 5, wherein said instruction means decides which should be chosen, said first or second writing operation, in accordance with an image density of the image data.

* * * * *